United States Patent
Chuan

(10) Patent No.: US 7,083,013 B2
(45) Date of Patent: Aug. 1, 2006

(54) SELF-LEVELING AND BALANCING VEHICLE

(76) Inventor: Chen Wen Chuan, 4Fl., No. 7, Lane 36, An-Ping road, Chungho, Taipei Hsien (TW)

(*) Notice: Subject to any disclaimer, the term of this patent is extended or adjusted under 35 U.S.C. 154(b) by 169 days.

(21) Appl. No.: 10/789,150

(22) Filed: Feb. 27, 2004

(65) Prior Publication Data
US 2004/0168842 A1     Sep. 2, 2004

(30) Foreign Application Priority Data
Feb. 27, 2003   (TW) .............................. 03104941 A

(51) Int. Cl.
*B62D 37/00*  (2006.01)
*B62D 33/073* (2006.01)
*A61G 5/00*   (2006.01)
(52) U.S. Cl. .................... 180/41; 180/8.2; 180/282; 180/326; 180/907; 280/5.2; 280/6.154
(58) Field of Classification Search ............... 180/41, 180/907, 326, 282, 8.2; 280/6.154, 5.2, 5.28
See application file for complete search history.

(56) References Cited

U.S. PATENT DOCUMENTS

| | | | | |
|---|---|---|---|---|
| 2,920,684 A * | 1/1960 | Fante et al. | ............ | 297/330 |
| 4,077,483 A * | 3/1978 | Randolph | ............ | 180/6.5 |
| 4,222,449 A * | 9/1980 | Feliz | ............ | 180/8.2 |
| 4,274,503 A * | 6/1981 | Mackintosh | ............ | 180/23 |
| 4,365,927 A * | 12/1982 | Schenck | ............ | 414/729 |
| 4,618,155 A * | 10/1986 | Jayne | ............ | 280/5.28 |
| 4,679,803 A * | 7/1987 | Biller et al. | ............ | 180/9.23 |
| 4,944,555 A * | 7/1990 | Brusasco | ............ | 297/330 |
| 6,003,891 A * | 12/1999 | Broadhead | ............ | 280/304.1 |
| 6,105,706 A * | 8/2000 | Cooper | ............ | 180/282 |
| 6,173,973 B1 * | 1/2001 | Robinson | ............ | 280/6.154 |
| 6,357,776 B1 * | 3/2002 | Goertzen et al. | ............ | 280/304.1 |

* cited by examiner

*Primary Examiner*—Paul N. Dickson
*Assistant Examiner*—George D. Spisich
(74) *Attorney, Agent, or Firm*—Bacon & Thomas

(57) ABSTRACT

A self-leveling and balancing vehicle composed of a base and a moving and driving mechanism installed on the base, the mechanism having two longitudinal moving seats installed on the guiding rails fixed on the base, a connecting frame extending to and connecting the two moving seats, and two sector gears installed on the two moving seats. A driving motor and a sensor are installed on the connecting frame, two level driving gears installed on two ends of the driving shaft and engaged with the two sector gears, a balance gear box installed on the driving shaft and having an output shaft extending to the connecting frame, and two driven gears installed on two ends of the output shaft and engaged with the racks fixed on the base.

7 Claims, 7 Drawing Sheets

SELF-LEVELING AND BALANCING VEHICLE

BACKGROUND OF THE INVENTION (1) Field of the Invention

This invention relates to a self-leveling and balancing vehicle, especially a vehicle which can be kept in a level and balanced position when it is moving on a slope or uneven road.

(2) Description of the Prior Art

To move along a slope is a common thing for various vehicles, but a vehicle will decline when it travels on a slope. Accordingly, when a vehicle is on a slope, the people or objects in the vehicle may fall down or collide with each other and even permitting the vehicle to turn over or cause accidents. With reference to China Patent No. 99116012.6, there is disclosed a leveling device for vehicles to solve this problem. A leveling device for vehicles (such as shown in FIG. 8) has a base A and a driving system B, two sides of the base having respectively a sector gear A1, the sector gears being engaged respectively with the driving gears B1 of the driving system B installed on a seat C of the vehicle, thus the seat C can be kept on the level position when it is running on a slope by adjusting the angle between the driving gears B1 and the sector gears A1. However, this leveling device can only keep the seat of the vehicle in a level position but can not keep the vehicle in balance. Accordingly, the vehicle with such a leveling device still may turn over on a steep slope beyond 40 degree because it can not maintain balance, and further, the driving gears B1 and the sector gears A1 can not be firmly engaged with each other.

SUMMARY OF THE INVENTION

It is therefore the main object of this invention to provide a self-leveling and balancing vehicle which can be kept in a level and balance position when it is running on a steep slope to prevent the people or objects in the vehicle from falling down or colliding with each other.

The vehicle is composed of a base and a moving and driving mechanism installed on the base, the moving and driving mechanism having two longitudinal moving seats, a connecting frame extending to connect the longitudinal moving seats and two sector gears installed on the two longitudinal seats, respectively, a driving motor and a level sensor being installed on the connecting frame, the driving shaft of the driving motor extending to the sector gears, two level driving gears being installed on two ends of the driving shaft and engaged with the two sector gears, a balance driving gear box being installed on the driving shaft and having an output shaft extending to the connecting frame which can be rotated freely, and two driven gears being installed on two ends of the output shaft.

The base includes two guiding rails in parallel with the moving direction or longitudinal axis of the vehicle, the longitudinal moving seats being mounted on the two guiding rails, two racks being fixed between and in parallel with the two guiding rails, and the driven gears on the output shaft being engaged with the two racks.

When the vehicle is running up or down a slope, the level sensor can start the driving motor to automatically drive the driving shaft and cause the level driving gears to rotate along the sector gears and adjust the chair or platform on the connecting frame to a level position, and meanwhile, the two driven gears installed on the output shaft can be rotated reversely with the driving shaft and moved forward or backward along the racks to make the moving and driving mechanism move simultaneously along the guiding rails to a balance position.

BRIEF DESCRIPTION OF THE DRAWINGS

In the drawings, which illustrate the preferred embodiments and modes of operation of the invention, and in which like reference characters designate the same or similar parts throughout the several views.

DETAILED DESCRIPTION OF THE PREFERRED EMBODIMENTS

Figure 1:
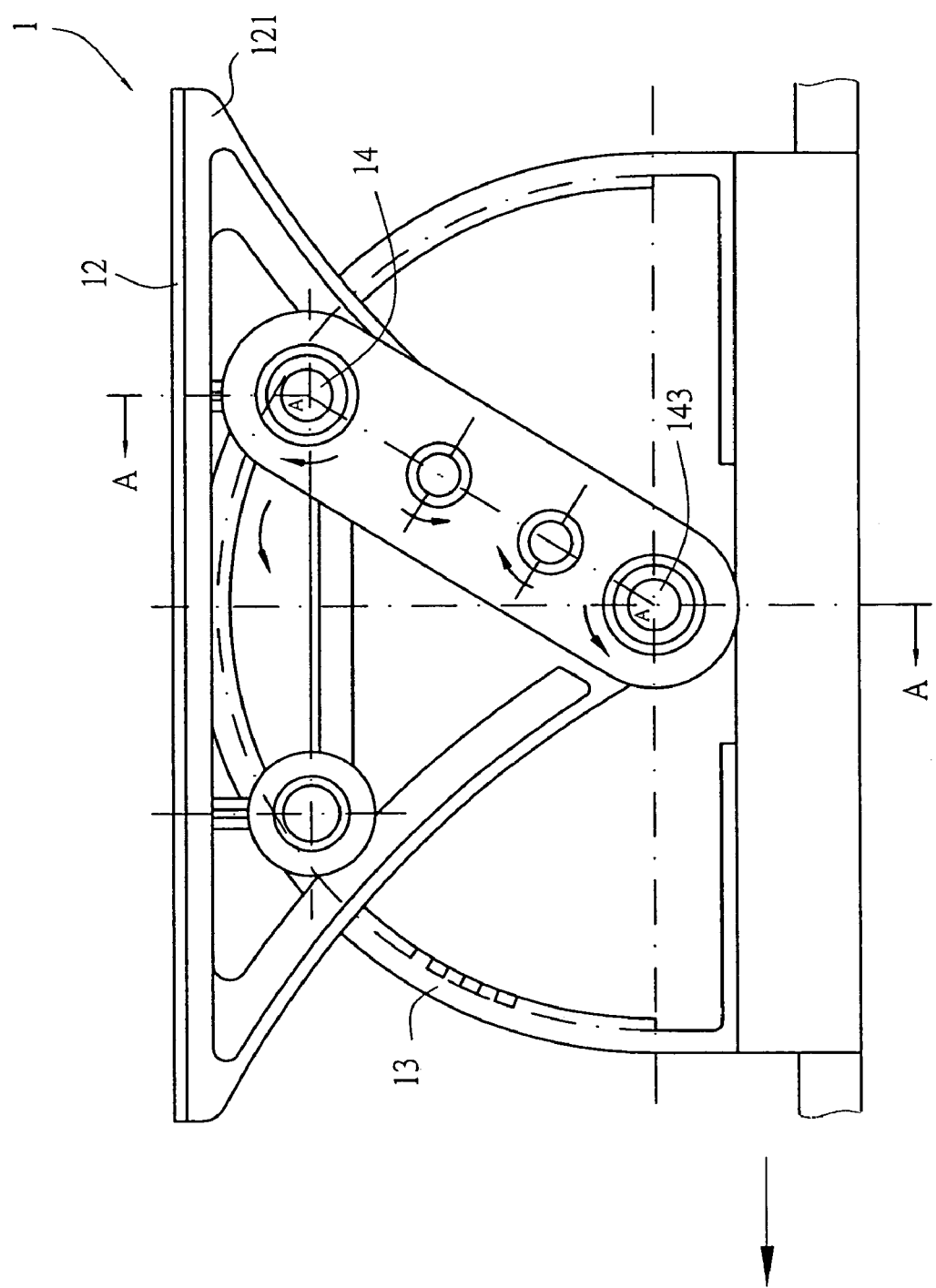
FIG. 1 is a plan view showing the longitudinal moving mechanism of a self-leveling and balancing vehicle of this invention.

Referring to FIG. 1 to FIG. 4, the present invention, a self-leveling and balancing vehicle, is composed of a moving and driving mechanism 1 and a base 2, wherein the moving and driving mechanism 1 is installed on the base 2. The moving and driving mechanism 1 has two longitudinal moving seats 11 formed at its two respective sides, a connecting frame 12 extending to and connecting the longitudinal moving seats 11 and two sector gears 13 installed on the two longitudinal seats 11. A driving motor 145 is fixed under the top of the connecting frame 12 and has a driving shaft 14 extending to the sector gears 13, with two ends of the driving shaft 14 being equipped with two level driving gears 141 which can be engaged firmly with the inward teeth of the two sector gears 13. A balance driving gear box 142 is installed on the driving shaft 14 and between the two sector gears 13, and an output shaft 143 of the balance driving gear box is located at the connecting frame 12 for free notation and provided with two last driven gears 1421, 1431.

Figure 2:
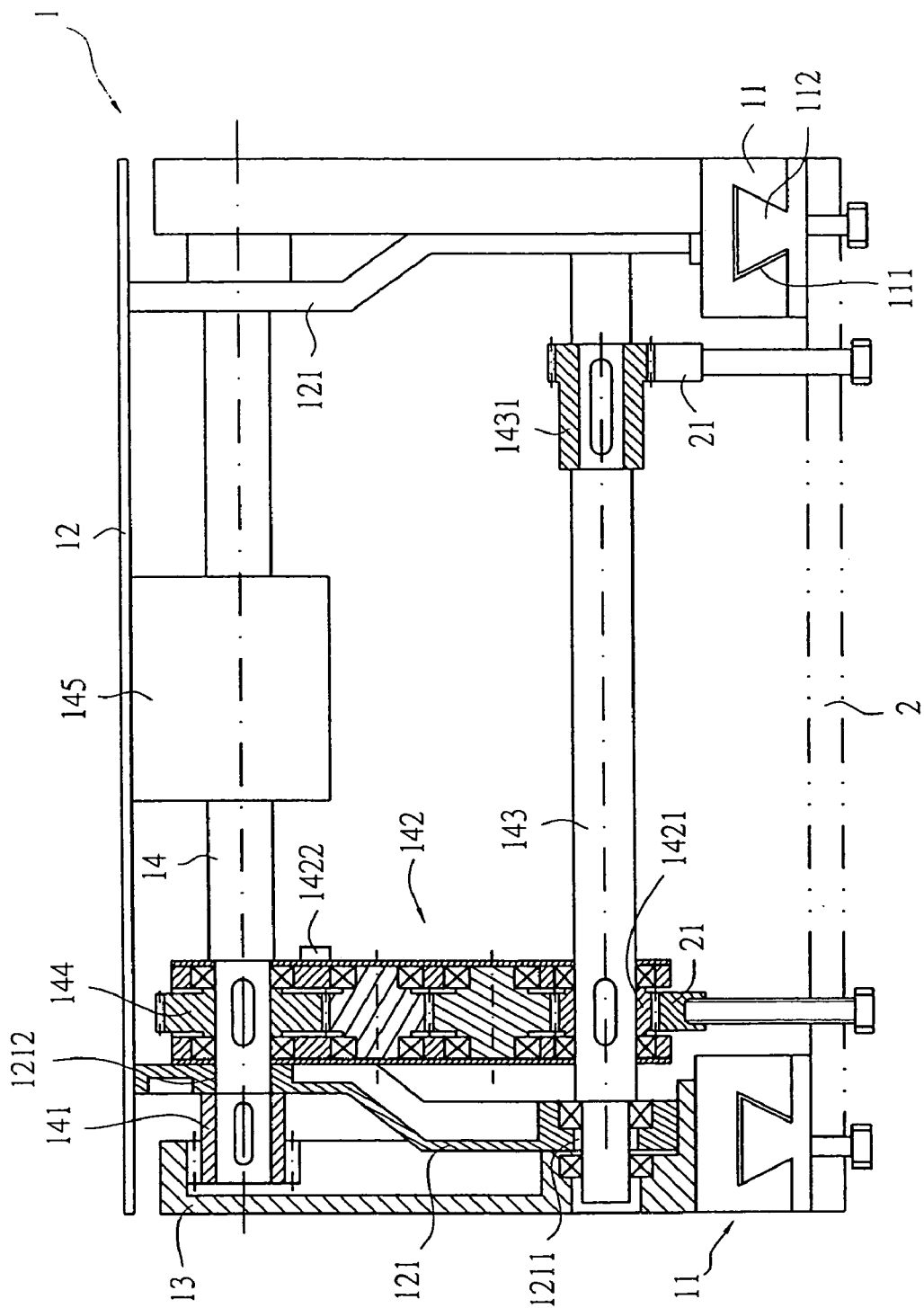
FIG. 2 is a sectional view of the wheel chair on line A—A in FIG. 1.
Figure 3:
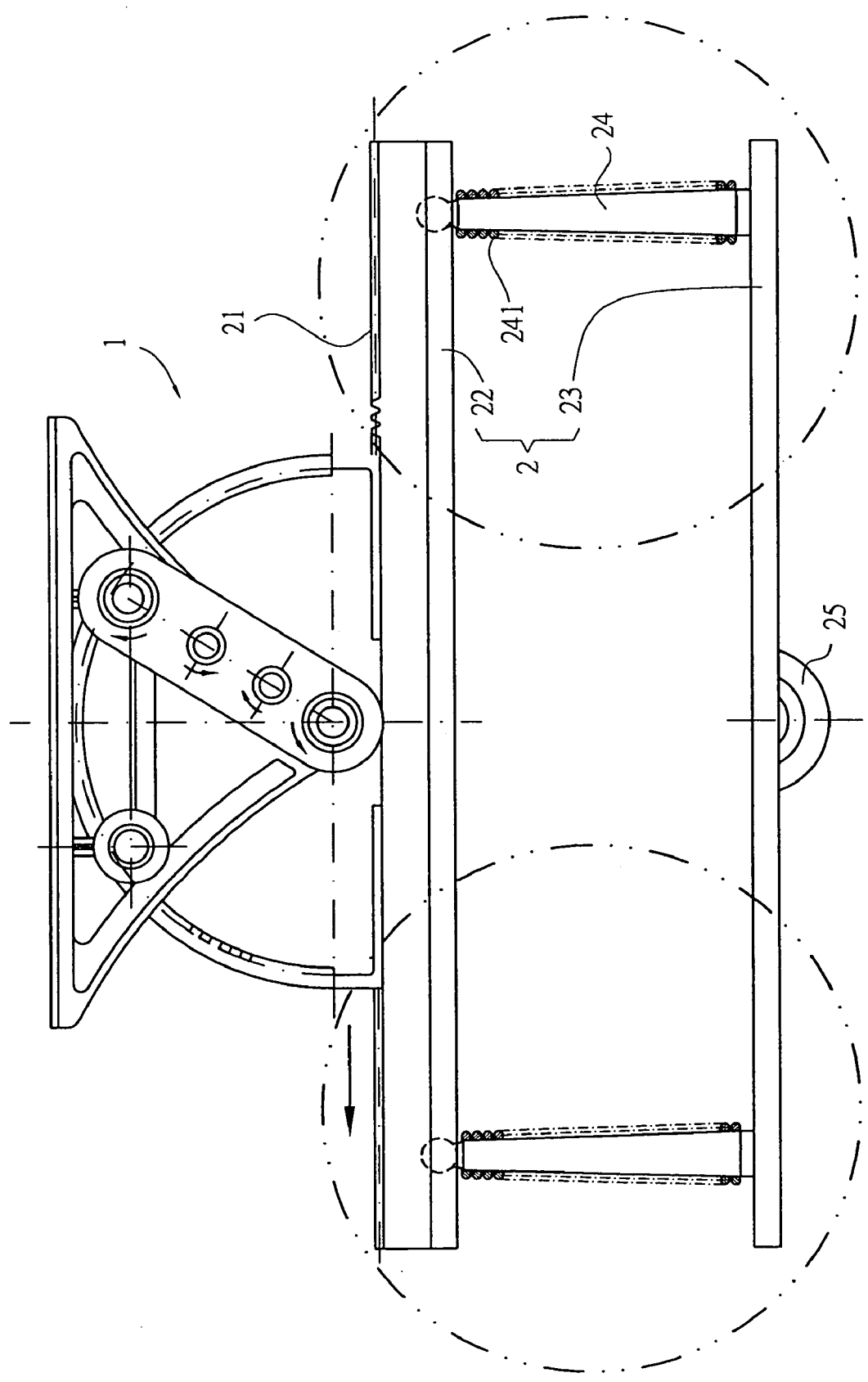
FIG. 3 is a plan view showing the self-leveling and balancing vehicle of this invention.
Figure 4:
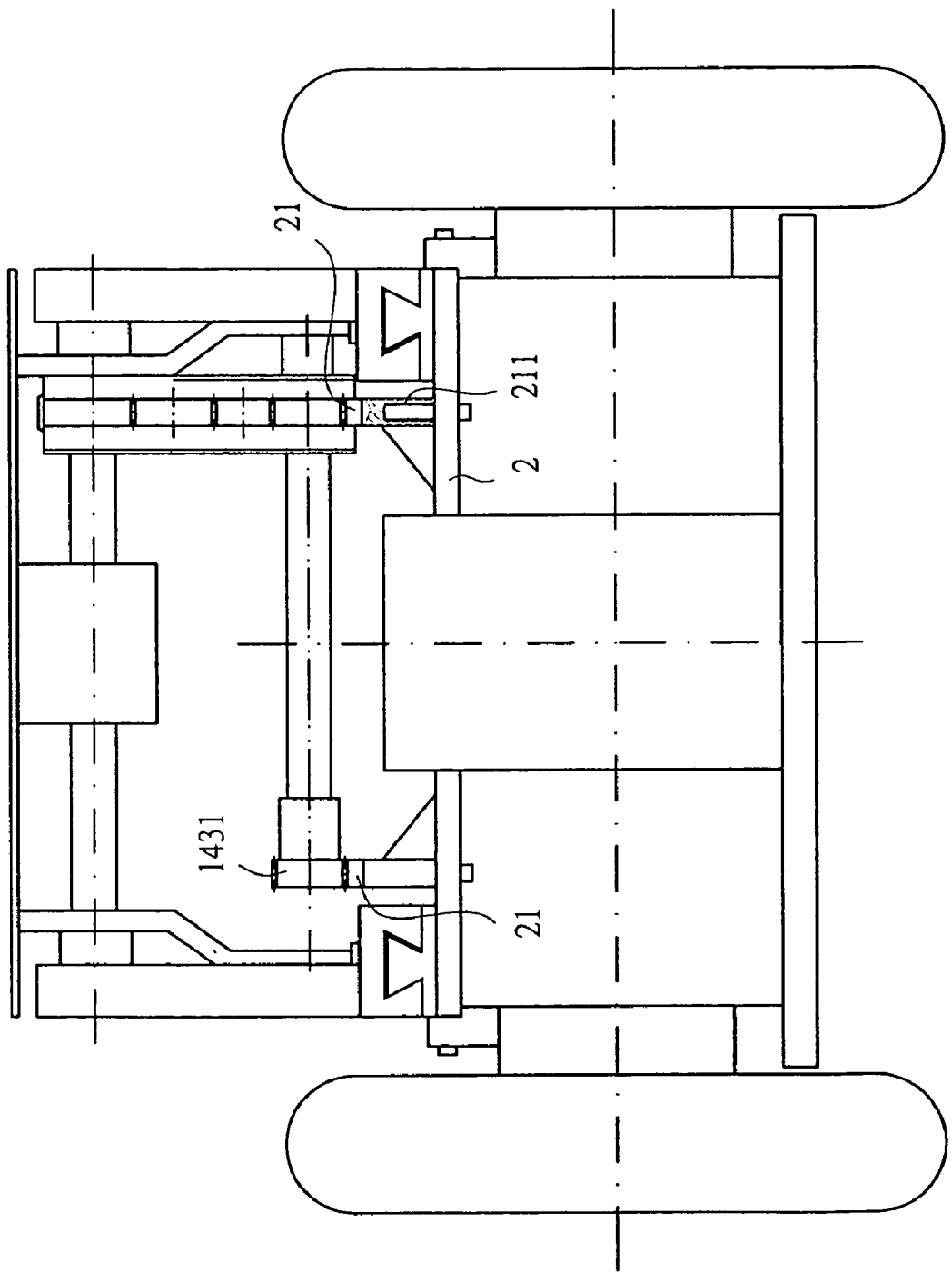
FIG. 4 is a left side elevational view of this invention.

Referring to FIG. 2, two guiding rails 112 are installed on two sides of the base 2, the sliding grooves 111 of the two longitudinal seats 11 being respectively fitted on the guiding rails 112. The fitting between the sliding groove and the guiding rail can be a dove-tail joint or other kind of joint. Two racks 21 are installed on two supporting posts 211 which are fixed on the base 2 and between the two guiding rails 112, the two racks 21 being parallel with the moving direction or longitudinal axis of the wheel chair. The driven gears 1421, 1431 on the output shaft 143 of the balance driving gear box 142 being engaged with the two racks 21 to permit the moving and driving mechanism 1 to be moved on the base 2.

The balance driving gear box 142 is composed of a case 1422 and an even number of engaged gears, such as two or four gears. In this embodiment, the balance driving gear box 142 has four gears. The driving gear 144 in the balance driving gear box 142 is installed on the driving shaft 14 and the driven gear 1421 is installed on the output shaft 143, with the driven gear 1421 being rotated reversely with the driving gear 144 by means of two intermediate gears.

The connecting frame 12 has a level sensor herein (not shown) for detecting whether or not the vehicle is in a level position. If not, then the level sensor can start the driving motor 145 to drive the level driving gears 14 and the balance driving gear box 142 to adjust the vehicle to a level and balance position. Two sides of the connecting frame 12 are each formed into a triangular supporting shape 121, the lower part of each side of the connecting frame 12 having a first locating hole 1211, with two ends of the output shaft 143 of the balance driving gear box 142 being installed in the first locating holes 1211 for free rotation. The upper part of each side of the connecting frame 12 each having a second locating hole 1212, and two ends of the driving shaft 14 of the driving motor 145 are installed in the second holes 1212 for free rotation. The top of the connecting frame 12 can be equipped with a chair or platform for carrying people or cargo.

The base 2 is composed of a top plate 22, a bottom plate 23 and three supporting posts 24 installed between the top plate 22 and the bottom plate 23. The top end of each supporting post 24 is pivoted on the top plate 22 and the bottom end of each post 24 is fixed on the bottom plate 23. A compression spring is installed on the supporting post 24 for absorbing vibrations created by a rough road. Two idler wheels 25 are installed adjacent the bottom center of the base 2, with each idler wheel having a compression spring (not shown) for supporting the vehicle when it is climbing up steps.

Figure 5:
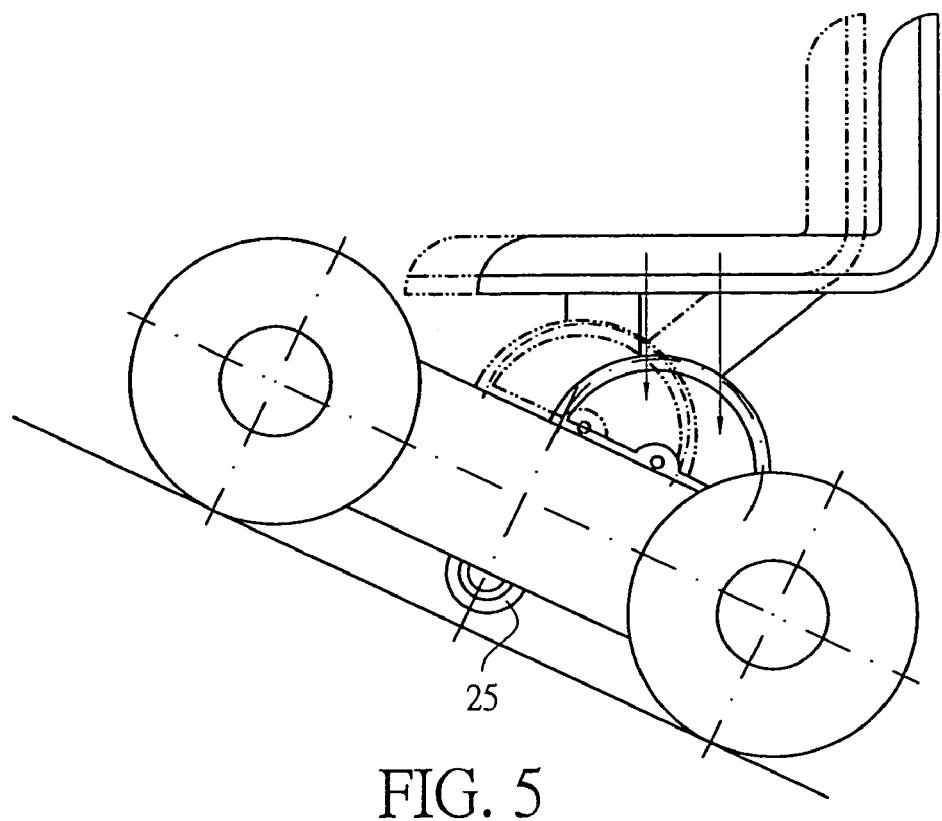
FIG. 5 is a plan view showing the status of the self-leveling and balancing vehicle running on a slope.

Referring to FIG. 1 and FIG. 5, the level sensor can detect automatically when the vehicle is not in a level position when the vehicle is running up a slope, so the level sensor can start the driving motor 145 to rotate the driving shaft 14 clockwise and the level driving gears 141 can rotate counterclockwise along the sector gears 13 to adjust the chair or carry platform on the connecting frame 12 to a level position. The driving gear 144 in the balance driving gear box 142 drives the driven gears 1421, 1431 to rotate counterclockwise and move forward along the racks 21, such that the moving and driving mechanism 1 can be moved forward along the guiding rails 121 to a balance position. The driving motor 145 can also drive the driving shaft 14 to rotate counterclockwise to adjust the chair or carry platform on the moving and driving mechanism 1 to a level and balance position when the vehicle is running down a slope.

Accordingly, the present invention provide a self-leveling and balancing vehicle wherein, when the vehicle is running up or down a slope, the chair or platform on the moving and driving mechanism can be automatically rotated and moved to a level and balance position to prevent people or cargo on the vehicle from falling down or colliding with each other.

Figure 6:
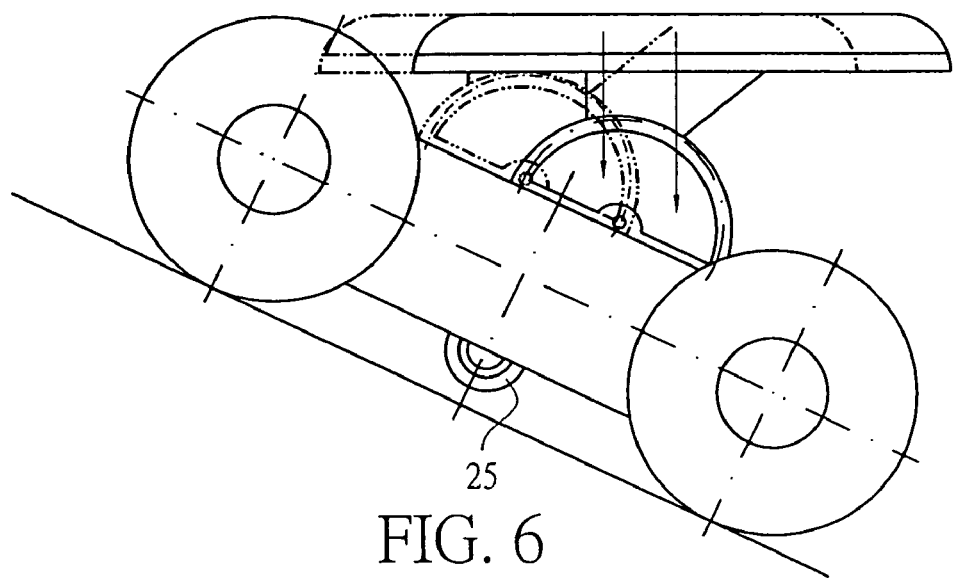
FIG. 6 is a plan view showing another embodiment of this invention.
Figure 7:
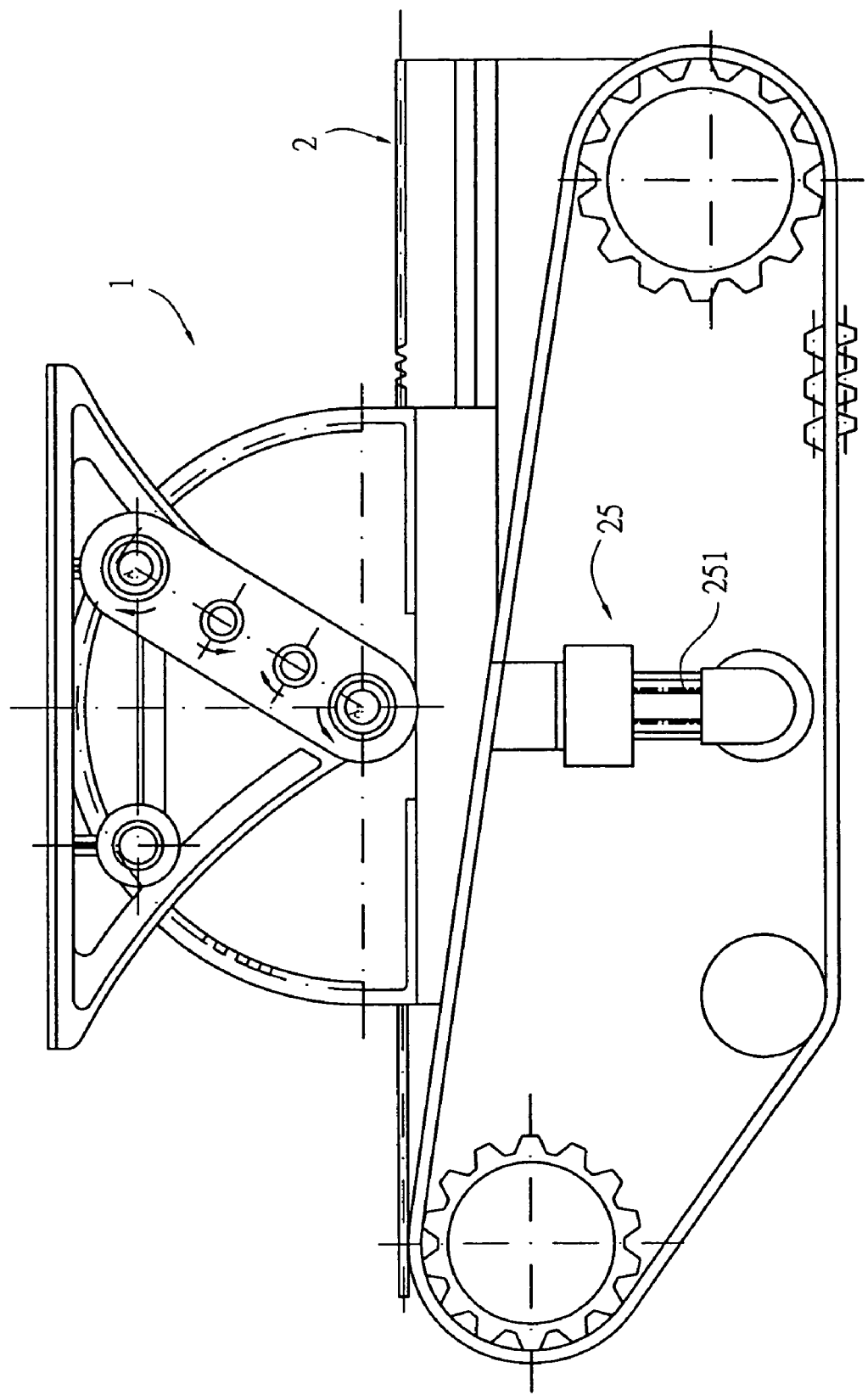
FIG. 7 is a plan view showing still another embodiment of this invention.
Figure 8:
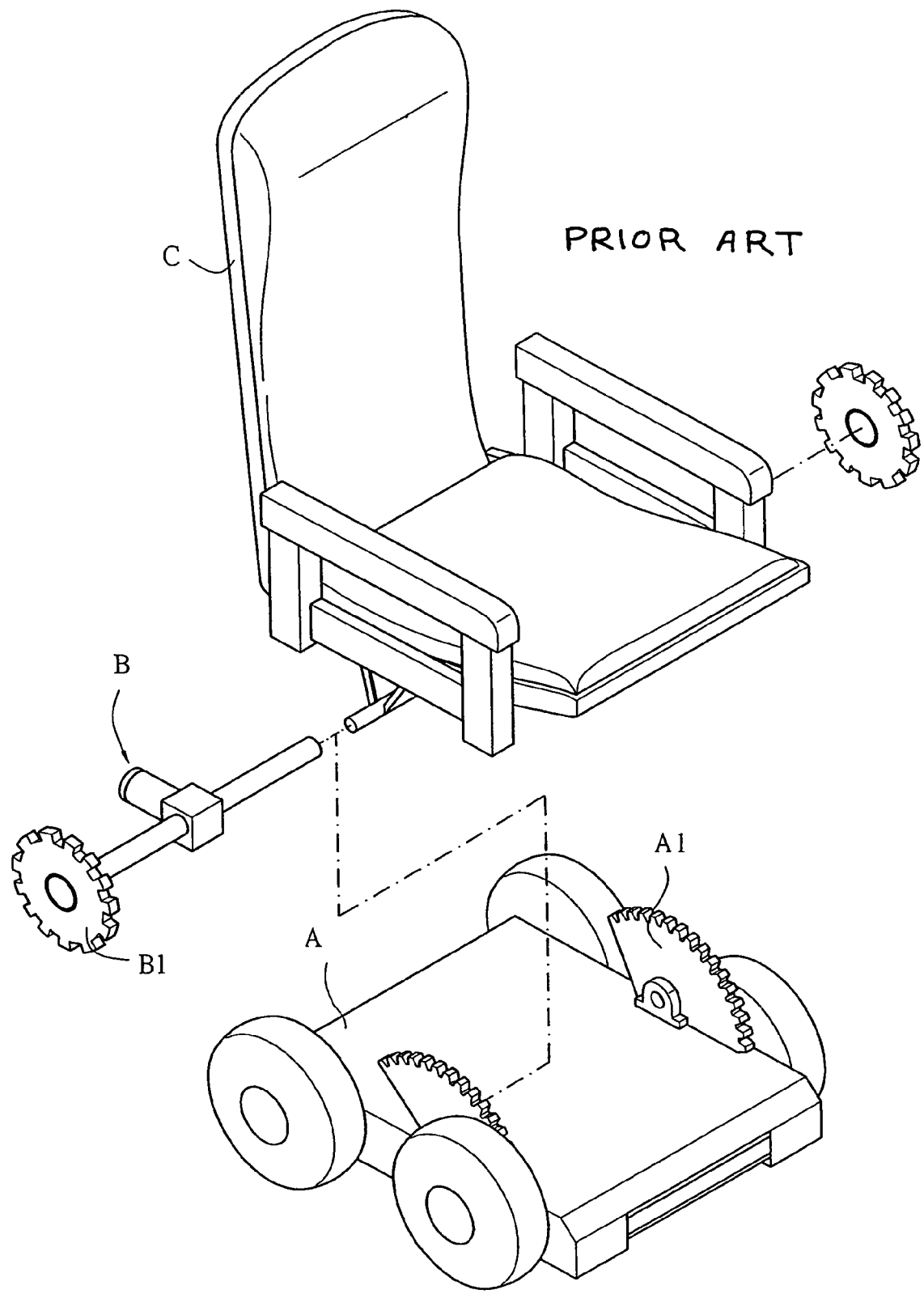
FIG. 8 is an exploded view showing a conventional wheel chair with a leveling device.

FIG. 6 shows another embodiment of this invention, wherein the chair installed on the moving and driving mechanism 1 can be replaced with a carry platform for carrying people or other cargo. FIG. 7 shows still another embodiment of this invention, wherein the wheels of the vehicle can be replaced with a caterpillar tread, with two idler wheels 5 being installed adjacent the inner top center of the base 2, and each idler wheel having a compression spring 251 for supporting the vehicle when it is climbing up steps.

It is understood by those skilled in the art that the foregoing description is a preferred device and that various changes and modifications may be made in the invention without departing the sprit and scope thereof.

I claim:

1. A self-leveling and balancing vehicle comprising:
   a moving and driving mechanism including two longitudinal moving seats formed at two sides thereof, a connecting frame extending to and connecting said longitudinal moving seats, and two sector gears respectively installed on said two longitudinal moving seats;
   a driving motor fixed under the top of said connecting frame, the driving motor having a driving shaft extending to said two sector gears;
   two level driving gears installed on two ends of said driving shaft and engaged with said two sector gears;
   a balance driving gear box installed on said driving shaft, the balance driving gear box having an output shaft extending to said connecting frame for free rotation, and two driven gears, each driven gear installed on each of two ends of said output shaft;
   a base including two guiding rails or guiding grooves disposed in parallel with a longitudinal axis of the vehicle, said longitudinal moving seats mounted on the two guiding rails or guiding grooves, two racks fixed between and disposed in parallel with the two guiding rails or guiding grooves, the driven gears on said output shaft are engaged with the two racks; and wherein
   when the vehicle is running up or down a slope, the driving motor drives the driving shaft to cause the level driving gears to be rotated along the sector gears to dispose a chair or carry platform on the connecting frame to a level position and the two driven gears installed on the output shaft of the driving gear box are caused to be rotated reversely with the driving shaft and moved forward or backward along the racks to cause the moving and driving mechanism to move simultaneously along the guiding rails or guiding grooves to a balance position.

2. A self-leveling and balancing vehicle as claimed in claim 1, wherein each longitudinal moving seat has a sliding groove or a sliding rail mounted respectively on the guiding rails or guiding grooves on the base.

3. A self-leveling and balancing vehicle as claimed in claim 2, wherein the sliding grooves or rails mounted on the guiding rails or grooves form a dovetail joint.

4. A self-leveling and balancing vehicle as claimed in claim 1, wherein the balance driving gear box includes a driving gear, two intermediate gears and a driven gear engaged with each other, the driving gear installed on the driving shaft of the driving motor and the driven gear being installed on the output shaft.

5. A self-leveling and balancing vehicle as claimed in claim 1, wherein the top of the connecting frame includes said chair or platform.

6. A self-leveling and balancing vehicle as claimed in claim 1, wherein the connecting frame includes two sides, each side is of a triangular shape, a lower part of each side having a first locating hole, two ends of the output shaft of the balance driving gear box installed in the first locating holes for free rotation, an upper part of each side having a second locating hole, and two ends of the driving shaft of the driving motor installed in the second locating holes for free rotation.

7. A self-leveling and balancing vehicle as claimed in claim 1, wherein the base includes a top plate, a bottom plate and three supporting posts installed between the top plate and said bottom plate, a top end of each supporting post is pivoted on the top plate and a bottom end of each supporting post is fixed on the bottom plate.

* * * * *